INVENTOR.
WILLIAM I. CALLAGHAN
BY Tilberry and Body
ATTORNEYS

Oct. 26, 1965 W. I. CALLAGHAN 3,214,001
UNSCRAMBLER
Filed Oct. 9, 1962 3 Sheets-Sheet 3
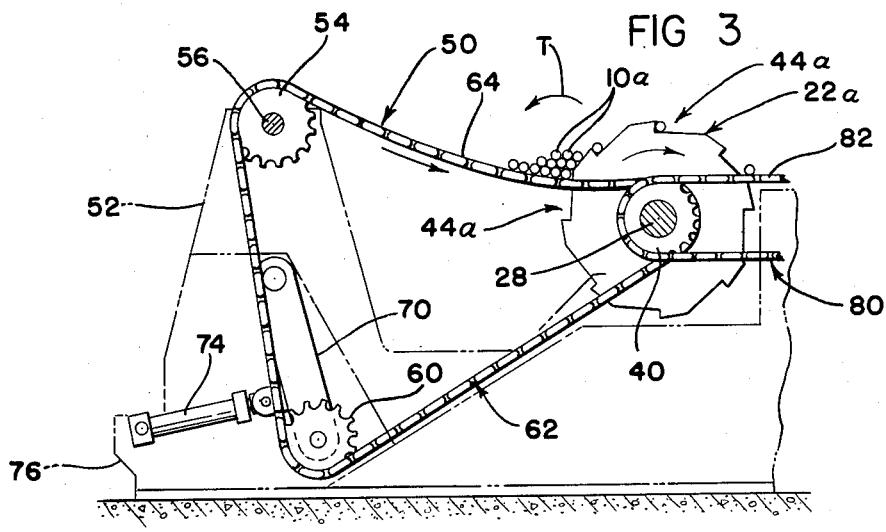
FIG 3
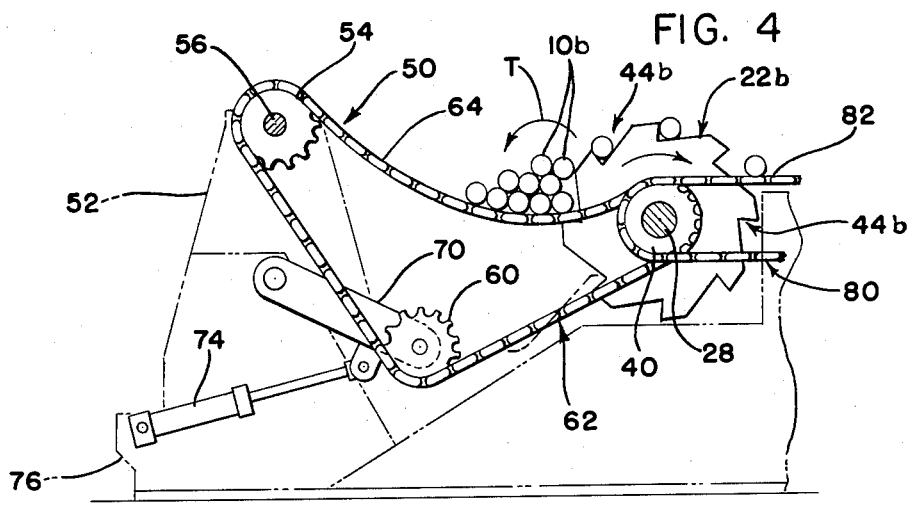
FIG. 4
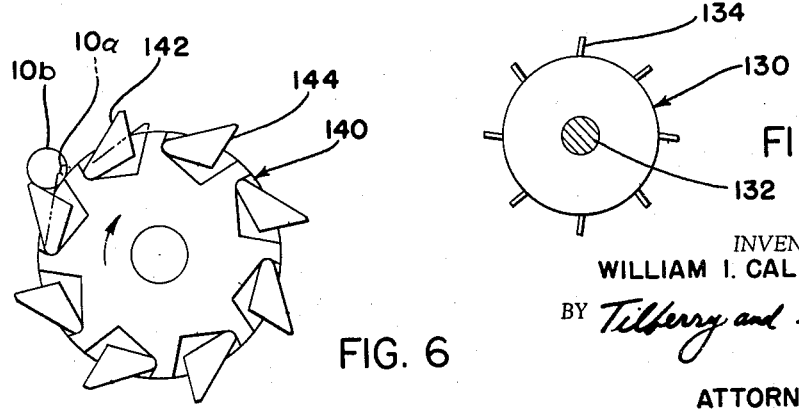
FIG. 5
FIG. 6
INVENTOR.
WILLIAM I. CALLAGHAN
BY Tilberry and Body
ATTORNEYS

United States Patent Office 3,214,001
Patented Oct. 26, 1965

3,214,001
UNSCRAMBLER
William I. Callaghan, Painesville, Ohio, assignor to Production Machinery Corporation, Mentor, Ohio, a corporation of Ohio
Filed Oct. 9, 1962, Ser. No. 229,292
7 Claims. (Cl. 198—34)

The present invention pertains to the art of handling elongated objects and more particularly to a device for unscrambling an unoriented bundle of elongated objects and laying the objects in parallel, side-by-side relationship.

The present invention is particularly applicable to unscrambling a bundle of randomly arranged, heavy rod-like members and laying the members in parallel, side-by-side relationship onto a conveyor; however, it is to be appreciated that the invention has much broader applications and may be used in unscrambling unoriented, randomly arranged, elongated, substantially straight objects having circular, oval, polygonal or other cross sections and being either solid or hollow. Hereinafter the terms "rods" or "rod-like members" will be used to indicate the objects being unscrambled, and it is to be understood that these terms are non-limiting and include the above-mentioned elongated objects and others.

In the manufacturing, processing, and handling of rod-like members, it is often necessary to unscramble a large bundle of unoriented, randomly arranged rods so that the rods may progress uniformly into a subsequent processing step. As an example, when rods are shipped for use in a screw machine or other types of machine tools, the rods are shipped in an unoriented bundle and they must be taken from the bundle and arranged in side-by-side, parallel relationship so that they may be fed into the machine tool. Manual unscrambling of these rod-like members becomes practically impossible as the size of the members increases; for instance, a large bundle of six inch diameter rod-like members having a length of thirty feet cannot be conveniently unscrambled manually and the need for a machine to rapidly unscramble such rod-like members is obvious.

Apparatus is known for the orderly feeding, or unscrambling, rods from an unoriented bundle. Such apparatus has included complicated mechanisms which required substantial maintenance and were expensive to install. Further, these known unscrambling apparatus had to be specially designed for the size and cross section of the rod-like member which was to be unscrambled and it was not possible to conveniently adjust any of the apparatus for handling rods, having a widely varied cross section or size. It was also found, in the prior apparatus, that the apparatus would operate fairly well when a full bundle of rods was being unscrambled; however, as the bundle diminished in size with removal of the rods, the efficiency of the unscrambling apparatus decreased drastically.

These and other disadvantages of the prior unscrambling apparatus have been eliminated by the present invention which is directed toward a device for unscrambling a bundle of randomly arranged rods which device removes the rods from the bundle and deposits them in parallel, side-by-side relationship onto a conveyor or another transfer device.

In accordance with the present invention, there is provided a device for unscrambling a bundle of unoriented, elongated objects with the bundle extending in a predetermined direction. This device comprises a plurality of pick-up members, first means for moving the members in a predetermined path, and second means for axially tumbling the bundle. The predetermined path intersects and extends through the bundle and is substantially circular in shape. Also, each of the pick-up members comprises a relatively flat surface extending substantially the complete length of the objects with the flat surfaces being generally parallel to the predetermined direction in which the bundle extends.

In accordance with a further aspect of the present invention, the above-mentioned cradle means located adjacent the moving pick-up members is adjustable to change the angle at which the bundle intersects the path of the moving pick-up members. By this arrangement, the unscrambling device is well adapted for use in unscrambling a wide variety of rod-like members without requiring structural change in the device itself.

The primary object of the present invention is the provision of an unscrambler adapted to unscramble a bundle of randomly arranged rod-like members, which unscrambler is economical to install, requires little maintenance and is capable of quickly unscrambling the rod-like members and depositing them in parallel, side-by-side relationship on a conveyor or a similar device.

Another object of the present invention is the provision of an unscrambler adapted to unscramble a bundle of unoriented, randomly arranged rod-like members, which unscrambler is conveniently adjustable to handle a wide variety of rod-like members.

Still another object of the present invention is the provision of an unscrambler adapted to unscramble a bundle of randomly arranged rod-like members, which unscrambler is automatically adjustable so that a decrease in the size of the bundle as the rod-like members are extracted causes an automatic adjustment to prevent a decrease in the operating efficiency of the unscrambler.

Still another object of the present invention is the provision of an automatically adjustable unscrambler as defined above wherein the adjustable feature is accomplished by providing a novel means sensitive to the weight of the bundle for adjusting the operating characteristics of the unscrambler.

Yet another object of the present invention is the provision of an unscrambler adapted to unscramble a bundle of randomly arranged rods and deposit the rods in parallel, side-by-side relationship, which unscrambler includes two relatively movable members, the first member including a plurality of pick-up members which move in a generally vertical path and the second member including a flexible element that moves in a caternary path and forms a cradle, the two paths being so arranged that they intersect so that the rods in the caternary cradle are tumbled as the pick-up members move through the bundle.

Still another object of the present invention is the provision of an unscrambler as defined above wherein the pick-up members are characterized as lands extending substantially the complete length of the rods in the bundle.

A further object of the present invention is the provision of an unscrambler adapted to unscramble a bundle of randomly arranged rod-like members then deposit the members in parallel, side-by-side relationship, which unscrambler can handle a wide variety of rod-like members and especially rather large members such as six to eight inch diameter rods having a length of thirty to forty feet. Further, these large rod-like members can be handled by the unscrambler without requiring additional equipment such as a heavy duty overhead crane.

These and other objects and advantages will become apparent from the following description used to illustrate the preferred embodiment of the invention as read in connection with the accompanying drawings in which:

FIGURE 3 is a partial side elevational view showing one adjusted position of the preferred embodiment of the invention;

FIGURE 4 is a partial side elevational view illustrating a second adjusted position of the preferred embodiment of the present invention; and FIGURES 5 and 6 are somewhat schematic side views illustrating modifications of the preferred embodiment of the present invention.

Figure 1:
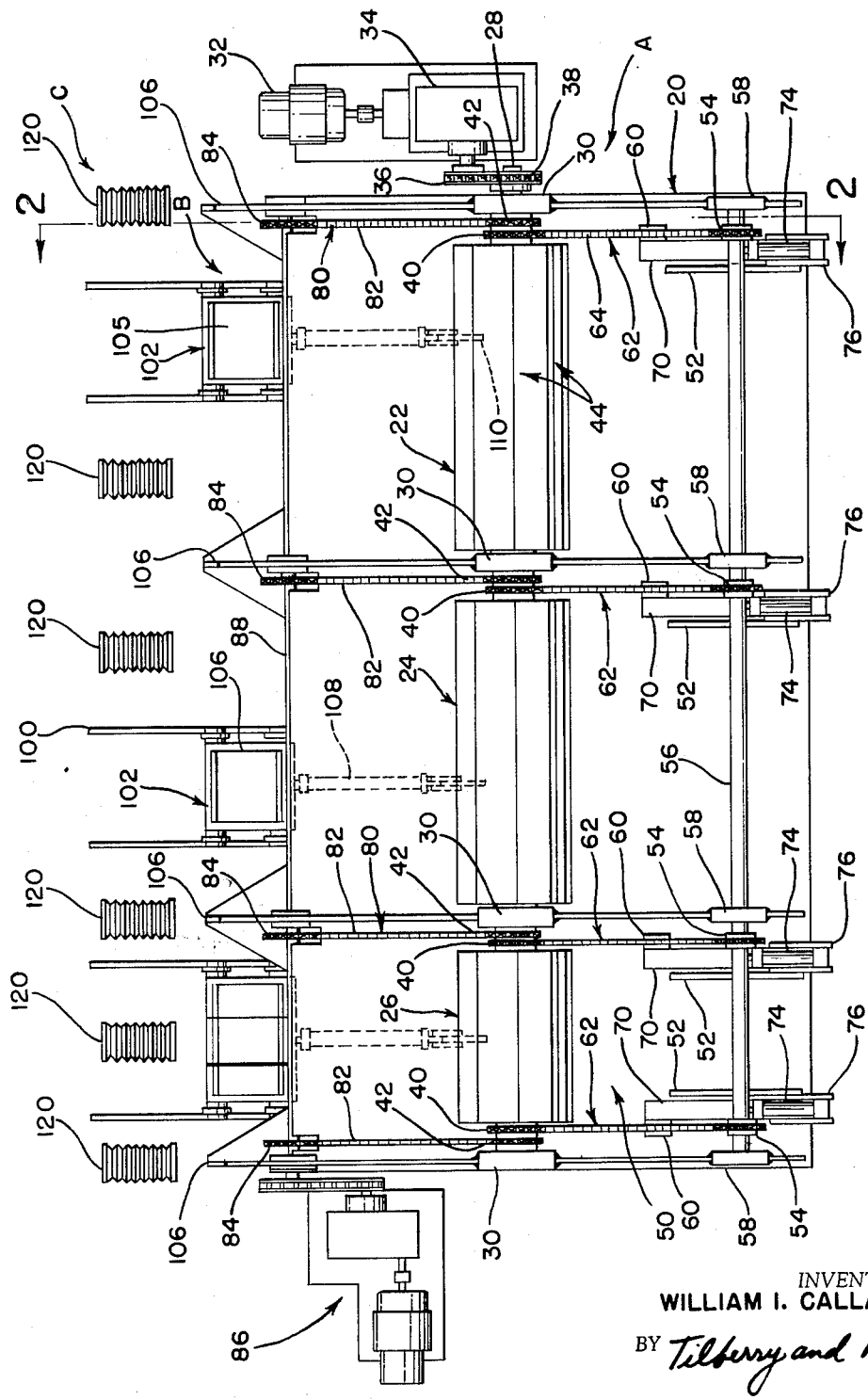
FIGURE 1 is a top plan view illustrating the preferred embodiment of the invention.
Figure 2:
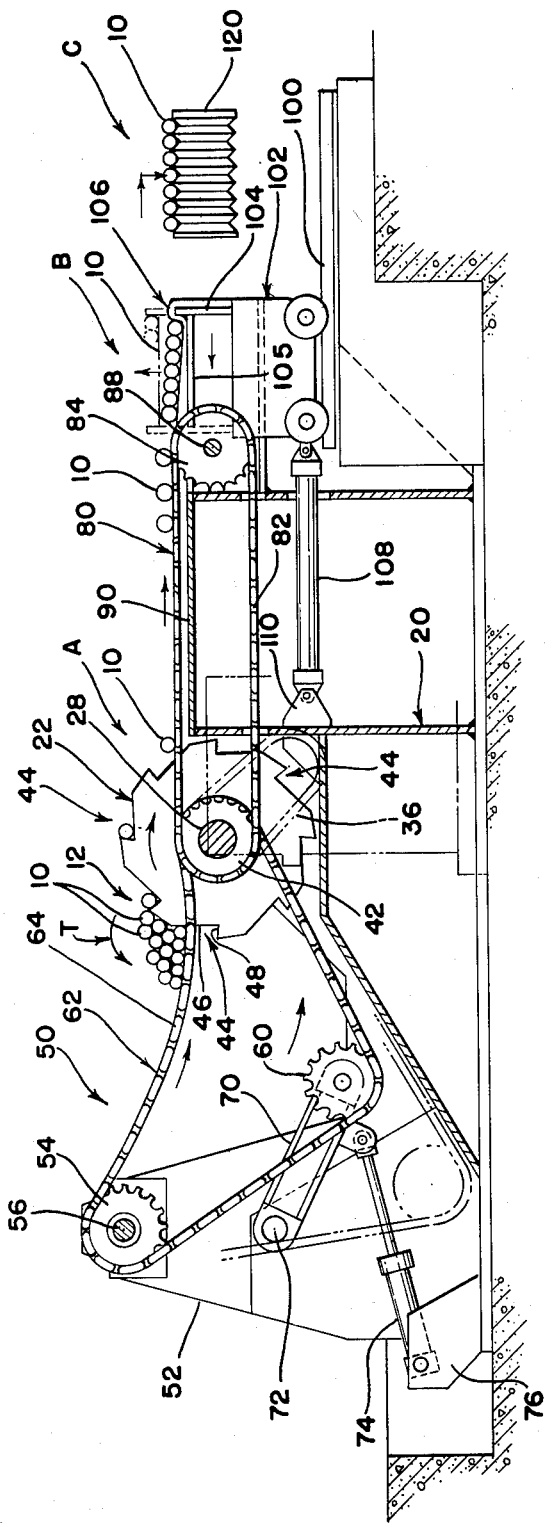
FIGURE 2 is a side elevational view taken along line 2—2 of FIGURE 1.

Referring now to the drawings, wherein the showings are for the purpose of illustrating preferred embodiments of the invention only and not for the purpose of limiting same FIGURES 1 and 2 show a device A for unscrambling rods 10 from a bundle 12 wherein the rods are unoriented and randomly arranged. The term "rod" as used herein is not intended to limit the scope of the present invention and it is appreciated that various rods, bars, tubes and other elongated members having various cross sectional areas may be unscrambled in device A without departing from the intended spirit and scope of the present invention.

The particular reason for unscrambling the rods 10 from bundle 12 is not important in describing the invention. It is well known that handling rods often involves separating them uniformly from an unoriented bundle. For instance, many times in the manufacture of rods it is necessary to transport the rods from one operating step to the other while the rods are in a bundle, such as bundle 12; and, accordingly, at the subsequent operating step, the rods must be reoriented. The unscrambler A is well adapted for this purpose; however, it is appreciated that the unscrambler may be used in loading a machine tool wherein rods are randomly arranged in a bundle from which they must be separated and fed into the spindle of the machine tool. Various other uses of the unscrambler A will be appreciated after the following description of a preferred embodiment of the invention. At the exit of the unscrambler A there is provided a transfer means B for shifting a plurality of the oriented rods 10 from the unscrambler onto a conveyor C from which conveyor the rods are axially moved into any desired position.

Referring in more detail to the unscrambler A, there is provided an appropriate under structure, or framework, 20 for supporting the various elements of the unscrambler. One primary component of the unscrambler is a device, or means, for moving a plurality of pick-up members in a predetermined, generally vertical path. A variety of devices could possibly be used for this purpose; however, in accordance with the preferred embodiment of the present invention there is provided a plurality of pick-up drums 22, 24 and 26 coaxially mounted in generally end-to-end relationship. The peripheries of the drums are substantially identical; however, the lengths of the drums may be varied as is shown in FIGURE 1 wherein the drum 26 is substantially shorter than the drums 22, 24. In this manner, one drum, or a combination of drums, may be used according to the length of the rods 10. For instance, if the rods are rather short, only the drum 26 is used. If the drums are slightly larger, either drum 22 or drum 24 may be used for the unscrambling operation. If the rods to be separated or unscrambled are still larger, the drums 24 and 26 may be used in combination to handle such rods. It is apparent, that a substantial number of combinations can be provided by the three drums as shown in FIGURE 1 to accommodate large variations in the length of the rod 10. It is further appreciated that the number of drums and their respective lengths may be varied without departing from the present invention and three drums are shown only to illustrate the preferred embodiment of the invention.

In accordance with the preferred embodiment, the drums 22, 24 and 26 are secured onto a common shaft 28 which is rotatably mounted in bearings 30 which are in turn supported onto framework 20. The shaft 28 and thus, the drums, are rotated by a motor 32 through a gear reducer 34, chain drive 36 and sprocket 38 or by any other appropriate drive arrangement. The drums rotate in the direction of the arrows of FIGURE 2 and have keyed thereto a plurality of drive sprockets 40 adjacent the ends of the respective drums. Also supported on shaft 28 are a plurality of idler sprockets 42 which, in the preferred embodiment, are free to rotate on the shaft 28. Accordingly, rotation of the drums causes rotation of drive sprockets 40, but not necessarily idler sprockets 42.

The outer peripheries of the pick-up drums 22, 24 and 26 are substantially identical and, as shown in FIGURE 2, there is provided a plurality of spaced pick-up members 44 comprising, basically, a leading edge 46 and a pick-up land 48. The width of the land 48 is such that a given number of rods 10 are picked up by the land as the drums rotate through the bundle 12. The leading edge 46 provides a relief for feeding the rods onto the lands. The lands extend the complete length of the respective drums to provide a continuous surface for picking up the rods. The rotating drums, in essence, comprise a means for moving the pick-up members 44 in a generally vertical path adjacent the unoriented bundle 12 of rods 10 and it is appreciated that various other means for moving the pick-up members adjacent the bundle could be used.

Passing the lands 48 vertically upwardly through the bundle 12 alone does not assure rapid separation of the individual rods from the bundles; therefore, it is necessary to provide a means adjacent the vertical path of the pick-up members 44 for loading the rods onto the pick-up members. In accordance with the present invention, the bundle 12 is tumbled in the direction of the arrow T around an axis generally through the center of the bundle as shown in FIGURES 2-4 at a position adjacent the periphery of the drums 22, 24 and 26 or the combination of drums being used. To properly tumble the bundle 12 adjacent the periphery of the drums, there is provided, in accordance with the present invention, a means forming a cradle 50 for the rods 10 which cradle is adjacent the moving pick-up members 44. The cradle means is divided into segments corresponding to the drums 22, 24 and 26 so that a proper cradling effect can be obtained if one or more of the drums are being used. Although it is appreciated that a variety of structural embodiments may be used to obtain the cradling effect of the rods adjacent the moving pick-up members 44, in accordance with the present invention, a plurality of stands 52 are spaced on framework 20 and rotatably mount sprockets 54 on shafts 56 in bearings 58. There is provided an idler sprocket 60 so that a chain 62 may be entrained over sprockets 40, 54 and 60 which chain is driven simultaneously with the pick-up drums by the drive sprockets 40. The chain 62 forms a cradle for the bundle 12 by providing a sliding between sprockets 40 and 54 which sling forms a catenary span 64 of the chain. Of course, although chain 62 is preferred, the sling could be formed by means other than a chain, i.e., a cable, rope, etc.

In essence, the unscrambler A comprises the catenary span 64 for supporting and tumbling the bundle in the direction of the arrow T in FIGURES 2-4 and the pick-up members 44 moving in an upwardly path which intersects the catenary span 64. The rods 10 are orderly removed from the bundle 12 by the combined movement of axially moving chain 62 and of the rotating pick-up drums.

Although the essence of the invention is the tumbling of bundle 12 by the cradle means 50 adjacent the moving drums 22, 24 and 26, it has been found that efficient and rapid removal of the rods from the bundle 12 depends on the angle at which the catenary span 64 intersects the path of the upwardly moving pick-up members 44 which angle should be adjusted as the size of the rods being separated is varied. Further, as the number of rods in the bundle decreases the angle of intersection should be changed. By providing the chain cradle adjacent the moving pick-up members, as the number of rods 10 in bundle 12 decreases the chain 62, more particularly the catenary span 64, tends to rise because of the decrease in weight on the chain which raises the angle at which the catenary span 64 intersects the path of the upwardly moving pick-up members. Accordingly, a weight responsive means is provided for adjusting the intersection angle. In this manner, as the number of rods decreases, the angle of the catenary span changes to provide substantially optimum removal rate from the bundle 12 during the complete cycle of unscrambling. It has been found that the size of the rods determines the angle at which the catenary span 64 should intersect the path of the upwardly moving pick-up members 44. For instance, relatively small rods 10a as shown in FIGURE 3 require a relatively steep angle between the catenary span 64 and the path of the upwardly moving pick-up members 44a on the drum 22a. This is compared to the relatively perpendicular intersection between the catenary portion 64 shown in FIGURE 4 which illustrates the intersecting angle for a number of relatively large rods 10b removable from the catenary span 64 by pick-up members 44b on the drum 22b. The drum 22b has larger pick-up members to accommodate the larger rods 10b whereas drum 22a has smaller pick-up members to handle the smaller rods 10a although a land 48 of a particular size may be used for a wide variety of rod sizes.

To adjust the intersecting angle between the catenary and the path of the pick-up members, a variety of devices could be used; for instance, sprocket 54 could be mounted on a drag brake having adjustable torque characteristics to provide the necessary catenary span 64. Although other devices are possible, in accordance with the preferred embodiment of the present invention, an arm 70 pivotally mounted at 72 is actuated by a cylinder 74 as best shown in FIGURES 2–4 and the cylinder is connected by appropriate means to the framework 20 by a bracket 76. Through this arrangement, the catenary span 64 may be adjusted to accommodate rods having different cross sections to obtain the optimum angle of intersection between the catenary span and the path of the upwardly moving pick-up members 44. Irrespective of the original settings, the angle of the catenary span 64 changes as the weight of the bundle 12 decreases to automatically compensate for the change in optimum intersecting angle as the number of rods decreases.

Referring again to FIGURES 1 and 2, the exit side of drums 22, 24 and 26 may be provided with appropriate means for removing the oriented rods 10 and, in accordance with the preferred embodiment, there is provided a chain, or belt conveyor, 80 comprising a plurality of generally parallel rearwardly extending chains 82 extending between idler sprockets 42 and appropriate drive sprockets 84, which drive sprockets are rotated by appropriate drive means such as motor and reducer 86 and common shaft 88. To vertically support the chain 82, there is provided a generally flat horizontal plate 90 along which the chains may ride. Since the idler sprockets 42 are rotatably mounted with respect to shaft 28, the conveyor 80 may be operated at a substantially different speed than the drums 22, 24 and 26 and the cradle means 50. In this manner, the conveyor 80 may be operated while the unscrambler A in general is not moving or the spacing between the parallel side-by-side rods on the conveyor may be changed by adjusting the speed on conveyor 80 with respect to the speed of the pick-up drums.

Referring now to the transfer device B one of which is located adjacent the exit end of each pick-up drum, said device comprises a set of rails 100, a dolly 102 mounted to move along the rails, and an elevator 104 having a support rack 105 for picking off the parallel, side-by-side rods 10 as they accumulate in nests 106 formed of outwardly extending portions of the framework. As is best seen in FIGURE 2, each dolly 102 is connected to the operating end of cylinder 108 which is in turn joined by appropriate means, such as a bracket 110, onto framework 20.

In operation of the transfer device B, the rods 10 accumulate on the nest 106 and the dolly 102 is moved to the left by actuation of cylinder 108. After dolly 102 is under the nest 106 the elevator 104 is actuated upwardly to engage rods 10 and lift them from the nest by rack 105. Thereafter, the cylinder 108 moves the dolly along rails 100 to deposit the rods onto a plurality of drive rolls 120 which form the conveyor C.

The unscrambler A receives a bundle of unoriented, randomly arranged rods 10 in the catenary span 64. As the chain 62 is moved toward drums 22, 24 and 26 the bundle 12 is tumbled in the direction T as is shown in FIGURES 2–4 while the drums rotate to move the lands 48 of pick-up members 44 through the tumbling bundle of rods. This action efficiently and quickly removes one rod, or another preselected number of rods, in parallel relationship from the bundle and moves the rods to a position where they are deposited on conveyor 80. Since lands 48 extend generally the complete length of the rods 10, they will not accept a rod until the rod is substantially parallel to the axis of the pick-up drum. The term "substantially parallel" means that the rods are for all practical purposes parallel to the axis of the drum. As the parallel, side-by-side rods 10 move along the conveyor they are deposited on nests 106 where they may be removed by the transfer device B and deposited on the conveyor C for axial movement along this conveyor.

FIGURE 5 shows a slight modification of the pick-up drum wherein the drum 130 is in the form of a paddle wheel having an operating shaft 132 and generally, radially extending blades 134. The blades 134 function in the unscrambler like lands 48 and they form an elongated trough for removing a parallel rod from the tumbling bundle 12.

A modification of the paddle wheel pick-up drum 130 as shown in FIGURE 5 is illustrated in FIGURE 6 wherein pick-up drum 140 is provided with peripherally spaced pick-up members 142 which may be adjusted in unison or separately from the solid line position to the phantom line position to change the effective length, or peripherally extended distance, of lands 144 so that the lands can accommodate either small rods 10a or large rods 10b. In accordance with this embodiment of the invention, various adjustable means may be used for changing the position of members 142.

The present invention has been discussed with reference to a particular structural embodiment; however, it is to be appreciated that structural changes may be made without departing from the intended spirit and scope of the invention as defined in the appended claims.

Having thus described my invention, I claim:

1. A device for unscrambling a bundle of unoriented, elongated objects, said bundle extending in a predetermined direction said device comprising in combination: a plurality of pick-up members, first means for moving said members in a predetermined path, and second means for axially tumbling said bundle, said predetermined path intersecting and extending through said bundle, said predetermined path being substantially circular and each of said pick-up members comprising a relatively flat surface extending substantially the complete length of said objects, said flat surfaces generally parallel to the predetermined direction in which said bundle extends.

2. A device as defined in claim 1 wherein said first means is drum-like and carries said pick-up members on the outer periphery thereof.

3. A device as defined in claim 2 wherein said second means is a catenary span formed by two spaced endless, non-extensible flexible members, said flexible members being movable in unison toward said first means and intersecting said predetermined path.

4. A device as defined in claim 3 including third means for adjusting the angle of intersection between said catenary span and said predetermined path.

5. A device as defined in claim 4 wherein said third means includes an idler wheel around which said endless flexible member is entrained and means for adjusting the position of said wheel.

6. A device as defined in claim 5 wherein said endless flexible member is a chain.

7. A device for unscrambling a bundle of unoriented, elongated objects, said device comprising in combination: a drum rotatable about a horizontal axis and having a plurality of pick-up members on the periphery thereof, an endless, non-extensible flexible member at each end of said drum and forming corresponding catenary spans extending radially and substantially horizontally from said drum, said flexible members forming a cradle for said objects, means for moving said flexible members along said catenary span and toward said drum whereby said objects are tumbled as said pick-up members on said rotating drum pass upwardly therethrough, an idler sprocket for said chain and means for adjusting the position of said idler sprocket to change the angle at which the catenary spans extend from said drum.

References Cited by the Examiner
UNITED STATES PATENTS

| | | | |
|---|---|---|---|
| 936,026 | 10/09 | Palmowsky | 198—103 X |
| 2,999,603 | 9/61 | Smejda | 198—34 X |
| 3,162,292 | 12/64 | Lawson | 198—33 |

SAMUEL F. COLEMAN, *Primary Examiner.*

EDWARD A. SROKA, *Examiner.*